(12) United States Patent
Calegari et al.

(10) Patent No.: US 12,107,860 B2
(45) Date of Patent: Oct. 1, 2024

(54) AUTHORIZATION MANAGEMENT METHOD AND SYSTEM FOR A UNIFIED GOVERNANCE PLATFORM WITH A PLURALITY OF INTENSIVE COMPUTING SOLUTIONS

(71) Applicant: BULL SAS, Les Clayes-sous-bois (FR)

(72) Inventors: Patrice Calegari, Boissy-sous-Saint-Yon (FR); Marc Levrier, Saint-Cyr-sous-Dourdan (FR)

(73) Assignee: BULL SAS, Les Clayes Sous Bois (FR)

( * ) Notice: Subject to any disclaimer, the term of this patent is extended or adjusted under 35 U.S.C. 154(b) by 736 days.

(21) Appl. No.: 17/132,398

(22) Filed: Dec. 23, 2020

(65) Prior Publication Data

US 2021/0203662 A1    Jul. 1, 2021

(30) Foreign Application Priority Data

Dec. 27, 2019  (FR) ...................................... 1915659

(51) Int. Cl.
*H04L 9/40* (2022.01)
(52) U.S. Cl.
CPC ........ *H04L 63/102* (2013.01); *H04L 63/0281* (2013.01); *H04L 63/0807* (2013.01); *H04L 63/20* (2013.01)
(58) Field of Classification Search
CPC ............... H04L 63/102; H04L 63/0281; H04L 63/0807; H04L 63/20; H04L 63/104; G06F 21/6236
See application file for complete search history.

(56) References Cited

U.S. PATENT DOCUMENTS 11,012,441 B2 *  5/2021  Totale ................... H04L 63/102
11,055,719 B2 *  7/2021  Jamkhedkar ......... G06Q 50/182
(Continued)

FOREIGN PATENT DOCUMENTS

EP          3109759 A1     12/2016

OTHER PUBLICATIONS

Zhao, J. T., S. Y. Jing, and L. Z. Jiang. "Management of api gateway based on micro-service architecture." Journal of Physics: Conference Series. vol. 1087. No. 3. IOP Publishing, 2018. (Year: 2018).*

(Continued)

*Primary Examiner* — Theodore C Parsons
*Assistant Examiner* — Sameera Wickramasuriya
(74) *Attorney, Agent, or Firm* — ARC IP Law, PC; Joseph J. Mayo

(57) ABSTRACT

The invention relates to a computer system and a method (100) for managing authorizations granted to a user client (2) from an aggregated interface (10) within the framework of unified governance of intensive computing solutions (70); the unified governance being ensured at least partly by an authorization management computer system (1) including: a proxy microservice (20), a token security microservice (30), at least one security repository (35, 36, 37), at least one authorization repository (40) and a computing microservice for each of the intensive computing solutions; said method including the steps of: Receiving (110) access information of a user client (2), Authenticating (120) the user client (2) and determining (130) at least one role attribute for the user client (2), Generating (140) an authentication token and determining (150) authorizations granted to the user client (2), by the at least one computing microservice.

20 Claims, 3 Drawing Sheets

(56) References Cited

U.S. PATENT DOCUMENTS

| | | | |
|---|---|---|---|
| 11,057,367 B2* | 7/2021 | Chatnalli Deshpande Sridhar ..... | H04L 67/10 |
| 11,061,929 B2* | 7/2021 | Xu ..................... | H04L 63/0876 |
| 11,310,059 B2* | 4/2022 | Leibmann ............. | H04L 9/0894 |
| 11,363,021 B1* | 6/2022 | Grubin ..................... | H04L 9/08 |
| 11,489,671 B2* | 11/2022 | Rosado ............... | G06F 9/45558 |
| 2012/0137213 A1* | 5/2012 | Hayler .................. | H04L 63/083 |
| | | | 715/239 |
| 2016/0028737 A1* | 1/2016 | Srinivasan .......... | H04L 63/0807 |
| | | | 726/4 |
| 2016/0112521 A1* | 4/2016 | Lawson ................. | H04L 67/02 |
| | | | 709/227 |
| 2016/0357517 A1* | 12/2016 | Levrier ..................... | G06F 9/44 |
| 2017/0223143 A1* | 8/2017 | Johnson ................. | G06F 9/541 |
| 2017/0230349 A1* | 8/2017 | Gaur ..................... | G06F 21/629 |
| 2018/0075231 A1* | 3/2018 | Subramanian ...... | H04L 63/0807 |
| 2019/0306157 A1* | 10/2019 | Lores .................... | H04L 63/126 |
| 2020/0059360 A1* | 2/2020 | Martynov ............... | H04L 63/08 |
| 2020/0074059 A1* | 3/2020 | Beckett, Jr. ............. | G06F 21/36 |
| 2020/0250009 A1* | 8/2020 | Jaeger ..................... | G06F 8/60 |

OTHER PUBLICATIONS

K. Andrews, S. Steinau and M. Reichert, "Enabling Fine-Grained Access Control in Flexible Distributed Object-Aware Process Management Systems," 2017 IEEE 21st International Enterprise Distributed Object Computing Conference (EDOC), Quebec City, QC, Canada, 2017, pp. 143-152, (Year: 2017).*

Search Report issued in corresponding French application No. FR1915659 dated Sep. 9, 2020, 2 pages.

Search Report issued in EP20217375.3 on Mar. 24, 2021 (18 pages).

* cited by examiner

AUTHORIZATION MANAGEMENT METHOD AND SYSTEM FOR A UNIFIED GOVERNANCE PLATFORM WITH A PLURALITY OF INTENSIVE COMPUTING SOLUTIONS

The invention relates to the field of high performance computing and more particularly to the interfacing to a single platform of several intensive computing solutions having different business logics. The invention concerns in particular a method for managing authorizations granted to a user client within the framework of a platform centralizing the access to a plurality of intensive computing solutions. Furthermore, the invention concerns an authorization management system capable of managing the authorizations granted to a user client within the framework of a platform centralizing the access to a plurality of intensive computing solutions.

PRIOR ART

The High Performance Computing, also called HPC, is being developed for university research as well as for industry, in particular in technical fields such as aeronautics, energy, climatology and life sciences. This computing is generally implemented by clusters. The objective of these clusters is to overcome the limitations on the existing hardware by pooling resources to allow the parallel execution of instructions and the memory capacity and disk aggregation. A cluster is a set of computing means (also called nodes or servers) interconnected by an interconnection network that can perform common operations. The High Performance Computing (HPC) is adopted by more and more scientists to help them solve complex problems. Particularly, with an increase between 2017 and 2018 of more than 50% of the power of the most powerful computer in the world, the computing power of the supercomputers is constantly increasing. In addition, there are an increasing number of computing centers (local, regional, national and international centers) equipped with petaflop-class systems. Since it is not possible for all the users to invest in the computer architectures capable of deploying such computing powers, some have specialized in providing access to these high performance computing solutions.

Thus, the last few years witnessed the emergence of platforms of access to intensive computing solutions (EP3109759). Particularly, many HPC portals have been developed. Internet portals are a common way to access the information and the services available on the computer networks. The portals often provide a single point of access to the data and applications. Furthermore, a portal can present a unified and customized view of information to the users.

Many HPC projects are developing their own community-specific Web portal and some HPC cloud providers have developed Web portals for their own use. The relationships between the portal and these information and storage systems are essential but complex to implement in a secure and efficient manner. The data processed in HPC environments can be very confidential (particularly for industries or financial organizations). The HPC portals need to manage these constraints in the way they execute the services on the main server (via impersonation, i.e. they execute the service "as" authenticated user), as well as in the way they display or filter the information in the HPC portal.

In addition, beyond the computing power and the high performance computing, the user scientists wish to be able to access intensive computing solutions such as quantum machines, quantum simulation, Deep Learning platforms or more broadly dedicated to the development of artificial intelligence solutions.

However, each of these solutions is hosted or made accessible by companies dedicated to either of these technologies and the use, in particular simultaneous use, of these different intensive computing solutions, becomes laborious.

Thus, with the proliferation of the types of intensive computing solutions and the complementarity of some of these solutions, it appears necessary to have a platform allowing indifferently accessing different intensive computing solutions in a secure manner.

Technical Problem

The aim of the invention is therefore to overcome the drawbacks of the prior art. Particularly, the aim of the invention is to propose a method for managing authorizations granted to a user client, in particular within the framework of unified governance of a plurality of intensive computing solutions, said method making it possible to effectively implement a complex right matrix. The aim of the invention is also to propose a computer system for managing authorizations granted to a user client from an aggregated interface. Such a system allows a unified double interfacing bearing both on a unified user interface base (frontends) and the unified interfacing of the business logics to the background platforms (backends) from different fields of the intensive computing.

BRIEF DESCRIPTION OF THE INVENTION

To this end, the invention relates to a method for managing authorizations granted to a user client from an aggregated interface within the framework of unified governance of a plurality of intensive computing solutions, said intensive computing solutions including at least two solutions selected among: a high performance computing server, a server dedicated to supervised or unsupervised learning and a server dedicated to quantum computing; the unified governance being ensured at least partly by an authorization management computer system including: a proxy microservice, a token security microservice, at least one security repository, at least one authorization repository, and at least one computing microservice for each of the intensive computing solutions; said management method including the steps of:

Receiving, by the token security microservice, access information of a user client, Authenticating the user client and determining, by the token security microservice, at least one role attribute for the user client from the access command information and data stored in the security repository, Generating a token, by the token security microservice, said token allowing an access to all the intensive computing solutions accessible to said user client based on the at least one determined role attribute, and Determining authorizations granted to the user client, by the at least one computing microservice, said determination being based on the at least one determined role attribute and data contained in the at least one authorization repository.

The method according to the invention is implemented within the framework of unified governance of a plurality of intensive computing solutions that allow exposing, according to a single model, models and fields of very varied intensive or high performance computing applications: High Performance Parallel Computing, Artificial Intelligence, Deep Learning and quantum computing simulation. This unified governance allows general convergence of various fields seeking to exploit the power and flexibility of the computing clusters or supercomputers as well as their cloud use.

The existing platforms for access to intensive computing solutions are specialized in a particular computing method and the software architectures concerned are not capable of managing the complexity of interacting with several computing intensive solutions.

Likewise, while microservices are used in many areas of IT, they have not been offered in a single architecture capable of aggregating data from or to different intensive computing solutions, each with their own specificities.

Indeed, in the absence of a suitable structure, it is not easy to design an architecture capable of managing the specificities of each of the intensive computing solutions while coordinating them from a single point. Thus, current solutions are not capable of managing the schedulers of several intensive computing solutions and processing flows representing very heterogeneous system loads on equally heterogeneous hardware. Likewise, architectures, based exclusively on microservices, offered in other areas of IT are not applicable to a solution that must aggregate several intensive computing solutions.

Moreover, a microservice corresponds by definition to a service that can "fit" in a virtual machine or a container, these two objects can never allocate more physical resources than the physical server (node) that hosts them. Conversely, a single scientific computation job, especially for a parallel distributed memory application (the most important case), aggregates the power of several tens, hundreds or thousands of these physical servers (nodes). Conversely, it is akin to a macro-job and is thus in total opposition to the various virtualization models that have made it possible to popularize the microservice approach.

Finally, most scientific computing applications, in particular in the very broad field of trades using digital simulation, have been developed on very old models (20, 30 years or even more), totally unsuitable for a connected, orchestrated or based on dynamic discovery. Most of these applications can be not integrated into a microservices framework. The idea here is to develop all of the state of the art middleware, themselves in the form of microservices, to drive a large number of applications on one or more high-performance infrastructures that can not themselves conform to this model.

The present invention allows to overcome the drawbacks thanks to a complementary use of the computing microservices, each being dedicated to an intensive computing solution cooperating with a proxy microservice and an aggregated interface.

Particularly, the method according to the invention allows fine-grained management of the authorizations within the framework of an interface aggregating the access to several intensive computing solutions.

The method according to the invention allows a single sign on for all the microservices with a single management of the roles and identities. For that purpose, part of the security verification of the unified governance in an execution environment is advantageously carried out by token security microservice of the authorization management computer system. Particularly, security is ensured via an authorization framework that can be based on a role management, an authorization policy management, a token-based control mechanism, a delegation of the management of the identities and a delegation of the authentication mechanisms.

Furthermore, in addition to providing an aggregated interface that allows integrating several intensive computing solutions and making them compatible with the classic software products, the presence of the different abstraction layers in the form of microservices allows a standardization of the exchanges and a standardization of the views (interfaces).

Such a method allows coupling a very flexible and generic (ensured by the security microservice) and very accurate (ensured by each of the intensive computing solution microservices) authentication. Indeed, the token security microservice allows assigning a role but it is not able to perform a fine-grained assignment of authorizations to each of the functionalities of the different intensive computing solutions. The token security microservice is then for example completed by a catalog of special authorizations in the computing microservices. This catalog can be implemented as a table in the database of the backend (either in its own microservice or in a dedicated microservice).

Thus, the method according to the invention allows an authorization management within the framework of a solution proposing a single entry point towards the different business logics (backends) and this with unified ergonomics (e.g. standardized workflow buttons, menus, logics . . . )

According to Other Optional Characteristics of the Method:
- The access information of a user client comes from a message sent from an aggregated interface of the user client to the proxy microservice. Thus, the information passes through the proxy microservice within which it can be stored. Alternatively, the access information of a user client comes from a message sent from an aggregated interface of the user client directly to the token microservice. This allows simplifying the authorization procedure.
- the message coming from the user client includes identification data of the user client. This allows determining from which hardware device the connection is required.
- the generation of a token by the token security microservice includes the access to a plurality of directories, preferably to at least LDAP (Lightweight Directory Access Protocol) type directories, Active Directory® and Kerberos®. The plurality of possibilities offered allows conferring a high adaptability to the method according to the invention.
- the generated token is a persistent login token and it allows an authentication and a role assignment to the user client for all the computing microservices of the IT infrastructure without the need to re-identify.
- the step of determining at least one role attribute for the user client includes the assignment of a role shared by all the computing microservices. Thus, the authorization procedure is facilitated.
- the step of determining at least one role attribute for the user client includes the assignment of a specific role to at least one computing microservice.
- the step of determining at least one role attribute for the user client is performed from the access command information and data stored in a security repository.
- it includes a step of modifying the aggregated interface as a function of authorizations granted to the user client.
- it includes a task planning step including the determination by at least one computing microservice of an amount of resources of a computing solution which will be assigned to a given task.

it includes a task planning step including a queue update, by each of the computing microservices.

the task planning step includes a queue update taking into account a priority index value transmitted by the user client.

Other implementations of this aspect comprise computer systems, apparatuses and corresponding computer programs recorded on one or several computer storage devices, each being configured to perform the actions of a method according to the invention. Particularly, a system of one or several computers can be configured to perform particular operations or actions, in particular a method according to the invention, through the installation of a software, firmware, hardware or a combination of software, firmware or hardware installed on the system. Furthermore, one or several computer programs can be configured to perform particular operations or actions through instructions which, when executed by a data processing apparatus, cause the apparatus to perform the actions.

Thus, the invention also relates to a computer system for managing authorizations granted to a user client from an aggregated interface within the framework of unified governance of a plurality of intensive computing solutions, said intensive computing solutions including at least two solutions selected among: a high performance computing server, a server dedicated to supervised or unsupervised learning, and a server dedicated to quantum computing; said authorization management computer system including:

- a proxy microservice configured to receive access information of a user client;
- a token security microservice configured to receive the access information of a user client received by the proxy microservice, to authenticate the user client and to determine at least one role attribute for the user client from the access information and data stored in a security repository,
- said token security microservice being further configured to generate a token, said token allowing an access to all the intensive computing solutions accessible to said user client based on the at least one determined role attribute;
- at least one computing microservice for each of the intensive computing solutions, the at least one computing microservice being configured to determine authorizations granted to the user client, said determination being based on the at least one determined role attribute and data contained in an authorization repository.

Such a computer system allows a unified security management (identification, authentication, authorization) with a transparent management of service access rights at the computing microservices.

According to Other Optional Characteristics of the Computer System:

the token security microservice is configured to access a plurality of directories, preferably at least LDAP type directories, Active Directory® and Kerberos®. The plurality of possibilities offered is permitted by the structure of the system and allows conferring high adaptability to the invention.

It includes an add-on that allows taking into account authorization policies specific to each microservice (business logics), thus allowing a standardization of the exchanges between the proxy microservice and the token security microservice. This allows conferring great fineness to the management of the authorizations despite the management of very different intensive computing solutions. The add-on can, for example, take the form of software.

the token security microservice is configured so as to be able to assign shared roles or specific roles, preferably it is configured so as to be able to assign a role shared by all the computing microservices. This allows conferring great fineness to the management of the authorizations despite the management of very different intensive computing solutions.

the token security microservice is configured to route incoming requests towards an appropriate service as a function of a specified endpoint, logic, and/or arguments.

the computing microservice is coupled with an authorization catalog or authorization repository.

the computing microservices are selected among: a microservice linked to a high performance computing server, a microservice linked to a server dedicated to supervised or unsupervised learning, and a microservice linked to a server dedicated to quantum computing, particularly to quantum computing simulations.

the token security microservice is hosted on one or several different computer devices, distinct from the computer device(s) hosting the proxy microservice and/or the computing microservices.

it includes a management microservice configured to distribute computing tasks between computing means and to order them Other advantages and characteristics of the invention will become apparent upon reading the following description given by way of illustrative and non-limiting example, with reference to the appended figures.

Figure 1:
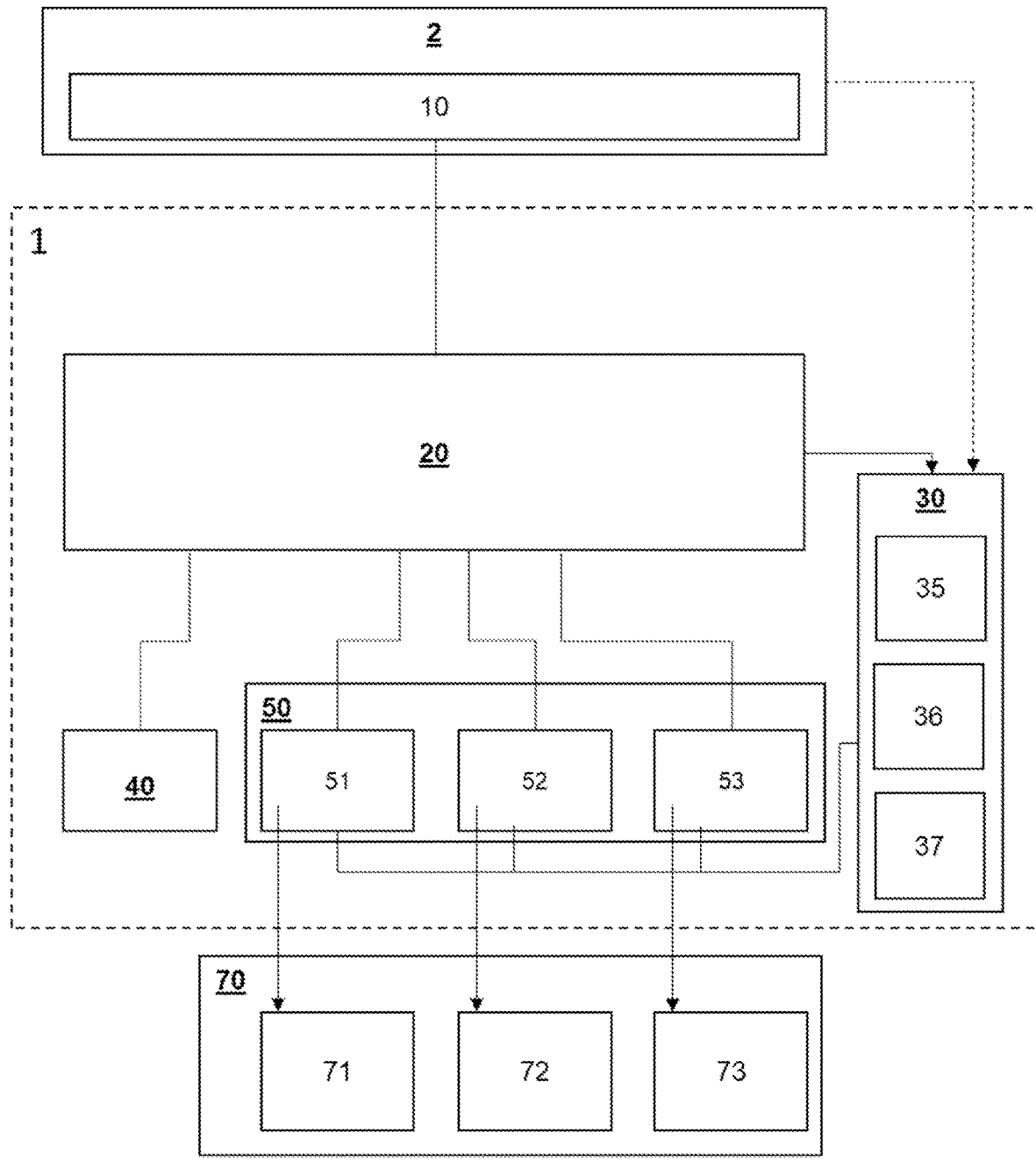
FIG. 1 represents a diagram of a computer system for managing authorizations granted to a user client according to the invention.

Aspects of the present invention are described with reference to flowcharts and/or to block diagrams of methods, apparatuses (systems) and computer program products according to embodiments of the invention.

In the figures, the flowcharts and the block diagrams illustrate the architecture, functionality, and operation of possible implementations of systems, methods and computer program products according to various embodiments of the present invention. In this regard, each block in the flowcharts or block diagrams can represent a system, a device, a module or a code, which comprises one or several executable instructions for implementing the specified logical function(s). In some implementations, the functions associated with the blocks can appear in a different order than the one indicated in the figures. For example, two blocks successively shown can, in fact, be executed substantially simultaneously, or the blocks can sometimes be executed in the reverse order, depending on the functionality involved. Each block of the schematic diagrams and/or of the flowchart, and combinations of blocks in the schematic diagrams and/or the flowchart, can be implemented by special hardware systems that execute the specified functions or acts or perform combinations of special hardware and computer instructions.

DESCRIPTION OF THE INVENTION

In the remainder of the description, the expression "authorization management" corresponds, within the meaning of the invention, to the ability to manage, based on predetermined rules, the access to the intensive computing solutions on the one hand and the user rights on these solutions such as reading, writing, copy, execution, modification and full control. In general, the authorization encompasses the permission policies, the management of the accesses and identities and the authentication.

The expression "intensive computing solution" preferably corresponds to IT infrastructures capable of executing intensive or high performance computing such as: High Performance Parallel Computing, Artificial Intelligence, Deep Learning, quantum computing and quantum computing simulation. The quantum computing broadly refers to any computing solution using quantum effects in order to find solutions to the computing problems.

The term "microservice" corresponds to an application chain generally including a plurality of applications capable of executing one or several tasks. The microservices can be linked together through APIs such as an API REST. The presence within the framework of the invention of microservices allows conferring a strong modularity and scalability to the solution, in particular with regard to the involvement of potentially very different intensive computing solutions.

The term "portlet" can designate connectable user interface software components that are managed and displayed in a Web portal. A portal page can be displayed as a collection of non-overlapping portlet windows, where each portlet window displays a portlet. Accordingly, a portlet (or collection of portlets) looks like a Web-based application that is hosted in a portal.

The expression "Web portal" or more simply "Portal" can designate an access tool for accessing different types of information and applications via a client system from the resources of the network. A tool for displaying a portal page can be a Web browser. However, a portal can also be integrated into other applications. The portals within the meaning of the invention are advantageously capable of presenting data from multiple sources such as Web applications in a single aggregated Web or browser interface. Furthermore, a portal provides the possibility of displaying portlets in the aggregated interface. The configuration of the portal can include a portal definition with for example a file including the extensible markup language (XML), the portlet definition files for all the portlets associated with the portal, the Java server pages (JSP), the Web application descriptors, images such as the graphics interchange format (GIFs) files, the deployment descriptors, the configuration files, the Java ARchive (JAR) files that contain logic and formatting instructions for the portal application, and all the other files needed for a desired portal application.

The term "request" can designate a request for information, generally identified by a "link" on a portal page. A request can be initiated by a "click" on a displayed symbol associated with the "link".

The expression "man-machine interface" within the meaning of the invention corresponds to any element allowing a human being to communicate with a particular computer and without this list being exhaustive, a keyboard and means allowing, in response to the orders entered using the keyboard, to display and optionally select elements displayed on the screen using the mouse or a touchpad. Another exemplary embodiment is a touch screen that allows selecting directly on the screen the elements touched by the finger or an object and possibly with the possibility of displaying a virtual keyboard.

The term "aggregated" or "aggregation" can correspond to the fact of presenting data coming from many different origins in a single location. The aggregation can also correspond to the creation of a new data from at least two different data. For example, this can correspond to a total duration before completion of a computing project, said total duration taking into account the duration before completion on a first intensive computing server and the duration before completion on a second intensive computing server, the two durations are not simply added together.

The expression "aggregated interface" or "aggregation interface" can designate within the meaning of the invention a graphical man-machine interface benefiting from a method for collecting and aggregating information coming from intensive computing solutions. Furthermore, an aggregated interface can benefit from the organization of the information according to one of the characteristics of the screen displaying said interface.

The term "client side" can designate activities that can be performed on a client in a client-server network environment. Accordingly, the activities that can be executed can be indicated by the term "on the server side" on a server in a client server network environment.

The term "plurality" within the meaning of the invention corresponds to at least two. Preferably, this can correspond to at least three, more preferably at least five and even more preferably at least ten.

It is meant by "process", "calculate", "execute", "determine", "display", "extract", "compare" or more broadly "executable operation", within the meaning of the invention, an action performed by a device or a processor unless the context indicates otherwise. In this regard, the operations relate to actions and/or processes of a data processing system, for example a computer system or an electronic computer device, which manipulates and transforms the data represented as physical (electronic) quantities in the memories of the computer system or other devices for storing, transmitting or displaying the information. These operations can be based on applications or software.

The terms or expressions "application", "software", "program code" and "executable code" mean any expression, code or notation of a set of instructions intended to cause a data processing to perform a particular function directly or indirectly (e.g. after an operation of conversion to another code). The program code examples can include, but are not limited to, a subroutine, a function, an executable application, a source code, an object code, a library and/or any other sequence of instructions designed for the execution on a computer system.

It is meant by "processor", within the meaning of the invention, at least one hardware circuit configured to execute operations according to instructions contained in a code. The hardware circuit can be an integrated circuit. Examples of a processor comprise, but are not limited to, a central processing unit, a graphic processor, an application-specific integrated circuit (ASIC), and a programmable logic circuit.

It is meant by "coupled", within the meaning of the invention, connected, directly or indirectly with one or several intermediate elements. Two elements can be mechanically, electrically coupled or linked by a communication channel.

In the remainder of the description, the same references are used to designate the same elements.

As has been mentioned, there are many intensive computing solutions available and accessible to the occasional users. However, there is no platform for unifying the access to a plurality of intensive computing solutions in a homogeneous, transparent and secure manner.

The inventors have therefore proposed a computer system, hereinafter referred to as "authorization management computer system", and allowing, via the use of a plurality of microservices, unified governance and an aggregated interface for the access to a variety of services from third-party providers of intensive computing solutions.

The intensive computing solutions generally require the fine-grained authorization management, allowing well compartmentalizing the authorizations according to the users. In order to propose unified governance of functional intensive computing solution and having a high level of security, the inventors have divided the management of the authorizations between several entities.

A first entity, a token security microservice, is in charge of managing the security and authentication functionalities to secure the system such as the authentication of the users and/or developers, the provision of different levels of access to the system based on the security identification information of the users and/or developers. On one or several second entities, such as computing microservices, are in charge of assigning the authorizations. Thus, the methods and systems developed by the inventors allow coupling flexible and robust authentication with fine-grained and easily scalable authorization assignment.

The invention therefore relates to a method 100 for managing authorizations granted to a user client 2. The authorization management will allow, thanks to the method according to the invention, an access to the intensive computing solutions for which the user client 2 has a subscription and only to these intensive computing solutions. Furthermore, as has been mentioned, it is advantageous to be able to benefit from a fine-grained authorization assignment allowing to finely define the authorizations of a given user client.

Advantageously, a method 100 for managing authorizations according to the invention is implemented from an aggregated interface 10. Furthermore, the aggregated interface 10 is advantageously composed of a plurality of portlets 11, 12, 13, each portlet can be indirectly associated with one of the intensive computing solutions 71, 72, 73.

Furthermore, such a method is implemented within the framework of unified governance of a plurality of intensive computing solutions 70. The intensive computing solutions 70 within the framework of the present invention are for example selected among: a high performance computing server 71, a server dedicated to supervised or unsupervised learning 72 and a server dedicated to quantum computing 73, particularly to quantum computing simulations. Particularly, a server dedicated to supervised or unsupervised learning 72 can be a server dedicated to supervised or unsupervised deep learning. Preferably, the intensive computing solutions for which the authorization management is implemented include at least two of the solutions listed above, more preferably at least three of the solutions listed above.

Particularly, as illustrated in FIG. 1 and as will be described later, the authorization management method and particularly the unified governance can be ensured by a computer system 1 including: a proxy microservice 20, a token security microservice 30, at least one security repository 35, 36, 37, at least one authorization repository 40 and at least one computing microservice 50, 51, 52, 53 for each of the intensive computing solutions. The computing microservices 50 within the framework of the present invention are for example selected among: a microservice 51 linked to a high performance computing server 71, a microservice 52 linked to a server dedicated to supervised or unsupervised learning 72, and a microservice 53 linked to a server dedicated to quantum computing 73, particularly to quantum computing simulations.

Figure 2:
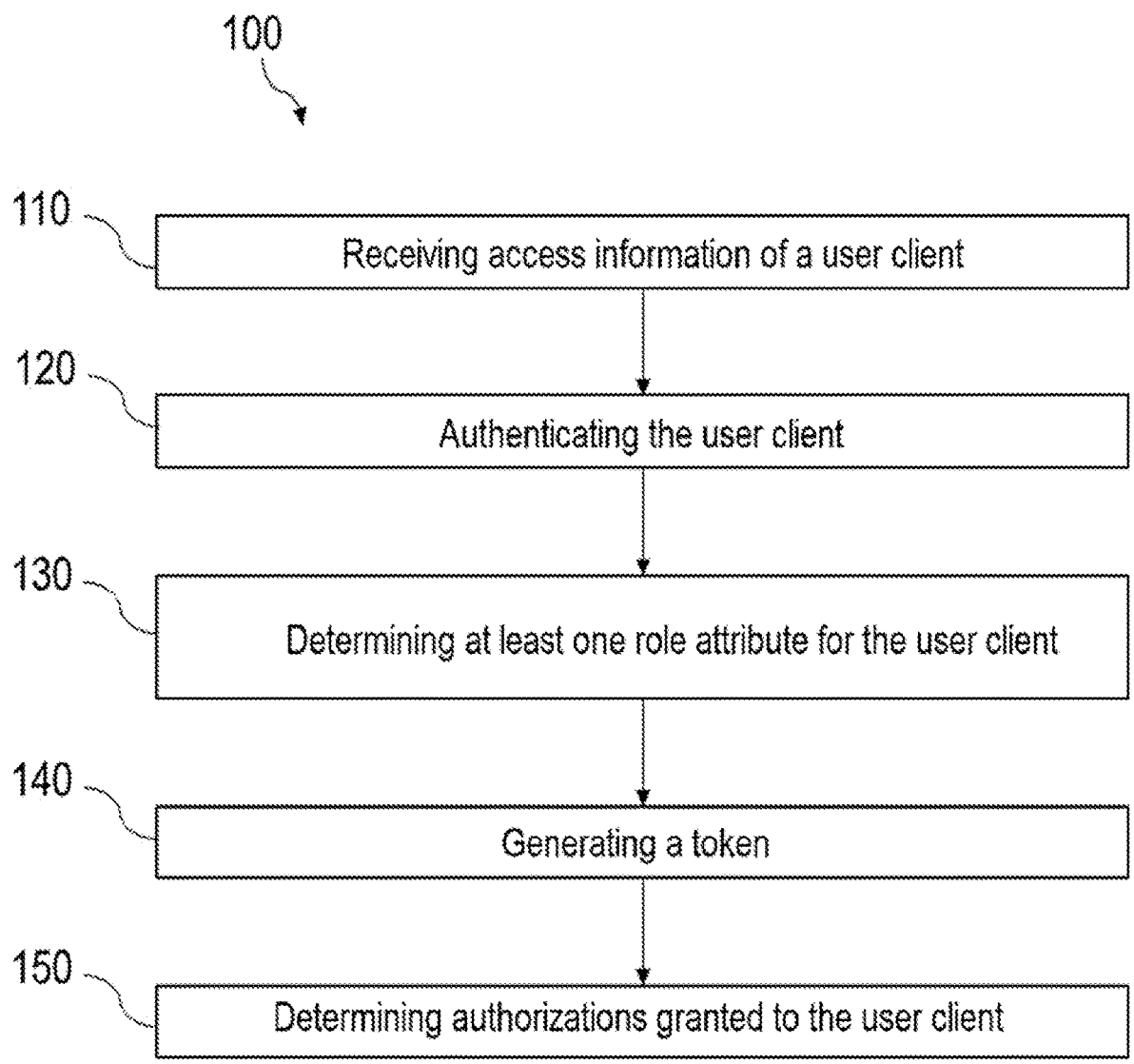
FIG. 2 represents a schematic illustration of a method for managing authorizations granted to a user client according to the invention.

As illustrated in FIG. 2, the management method 100 according to the invention includes the steps of receiving 110 access information of a user client 2, authenticating 120 the user client 2, determining 130 at least one role attribute for the user client 2, generating 140 a token and determining 150 authorizations granted to the user client 2.

Furthermore, a management method 100 according to the invention can include steps of submitting jobs, monitoring the jobs, suspending and resuming the jobs and modifying the parameters of the job.

Advantageously, a management method 100 according to the invention can include a step of modifying the aggregated interface as a function of authorizations granted to the user client. Indeed, once identified, the user client will be able to benefit from new functionalities and therefore from an aggregated interface consistent with these functionalities.

More particularly, the authorization management method according to the present invention includes a receipt 110 of access information of a user client 2.

Preferably, at least part of the access information is generated at the aggregated interface 10 of the user client 2.

Particularly, the receipt can be made by the token security microservice 30. However, preferably, this information is transferred from the user client directly or indirectly to the proxy microservice 20, then the proxy microservice 20 transfers this access information, modified or not, to the token security microservice 30.

The access information can for example take the form of a message coming from the user client including identification data of the user client 2.

The authorization management method according to the present invention includes an authentication 120 of the user client 2.

The authentication can for example be performed by any module capable of implementing a single Sign On (SSO) protocol. Different protocols can be used to perform the authentication of the user client 2. Preferably, the authentication 120 of the user client 2 is done according to a protocol selected among a known protocol OAuth allowing a third-party application to access a Web service, and SAML (Security assertion markup language) concerning a computer standard defining a protocol for exchanging information related to security and allowing the single Sign On of a user.

Advantageously, the authentication 120 of the user client 2 is not performed by the proxy microservice 20. More preferably, the authentication is performed by a token security microservice 30. There is thus a delegation, by the proxy microservice 20, from the identification, authentication and role assignment control to the token security microservice 30.

Particularly, the token security microservice 30 is configured to access a plurality of directories or security repositories 35, 36, 37, preferably at least LDAP (Lightweight Directory Access Protocol) type directories, Active Directory and Kerberos. The security repository 35, 36, 37 can correspond to a medium for storing keys and/or tokens, such as a database, a data file or any other system for secure storage in a memory. It is generally a secure medium for storing the names, passwords, roles and authorizations of the users. Preferably, it includes a role matrix and a subscription matrix.

Furthermore, the token security microservice 30 advantageously implements an OAuth-type and particularly OAuth 2.0-type protocol.

Preferably, although the token security microservice 30 forms part of a management computer system 1 according to the invention, it is advantageously hosted on one or several different computer devices (e.g. servers), distinct from the computer device(s) hosting the proxy microservice 20 and/or the computing microservices 50, 51, 52, 53.

There are many possible variants in the implementation of the authentication 120 of the user client 2. Advantageously, the token security microservice 30 can provide a very wide variety of authentication protocol but is not able to provide optimized fine-grained security controls. To overcome this situation, the inventors have proposed a delegation from only a control subset to the token security microservice 30. If the token security microservice 30 cannot provide sufficiently fine-grained security controls for intensive computing solutions, these controls will be entrusted to the computing microservices.

Furthermore, the proxy microservice can record information provided by the user client on a logging library and store this information in a database.

The authentication 120 of the user client 2 can also correspond to an authentication of a developer client. Advantageously, the token security microservice 30 will be invoked each time a third-party contacts the proxy microservice and requires an authentication.

Thus, an authorization management method according to the present invention includes a determination 130 of at least one role attribute for the user client 2.

Preferably, the determination 130 is performed by the token security microservice 30. The determination 130 of at least one role attribute for the user client 2 is for example performed from the access command information and data stored in a security repository 35, 36, 37.

Once the user client has been authenticated, the method according to the invention will allow the generation of a token allowing a temporary access to resources managed by the computing microservices. Particularly, the method according to the invention is based on authorizations controlled via previously determined roles or role attributes.

Based on the predetermined rules, a role is selected for a user client 2 and registered in an identification token of the user client.

The token can for example take the form of a JWT token (JSON Web Token). It contains the requests on the identity of the authenticated user client. Alternatively, the method according to the invention can implement a PASETO (Platform-Agnostic Security Tokens) type token, a Branca-type token or even a Macaroons-type token (Cookies with contextual warnings for the decentralized authorization in the cloud according to Google®).

Preferably, the authentication 120 and the determination 130 of at least one role attribute for the user client 2 are performed in accordance with the OAuth 2.0 protocol.

Particularly, the token security microservice 30 processes a message from the proxy microservice 20 and extracts the access request. The token security microservice 30 then compiles the list of the access rights granted for the user client 2 and requests a security token for the granted rights.

A token is then generated and transmitted to the proxy microservice 20 which in turn transmits it to the user client.

An authorization management method according to the present invention includes a generation 140 of a token. Particularly, this generated token allows an access to all the intensive computing solutions accessible (i.e. for which the user client has the authorizations) to said user client 2 based on the at least one determined role attribute.

However, this token does not generally allow finely defining the authorizations granted to the user client 2 for on one or several intensive computing solutions. More preferably, the generated token includes access rights to one or several intensive computing solutions as well as a role characteristic of the user client 2.

An authorization management method according to the present invention then includes a determination 150 of authorizations granted to the user client 2.

Advantageously, the authorization determination is based on the at least one determined role attribute and data contained in an authorization repository 40.

The authorization determination 150 can for example be performed by the proxy microservice or a computing microservice.

Preferably, the authorization determination 150 is performed by at least one computing microservice 50, 51, 52, 53.

For example, an intensive computing solution can have more than 50 functionalities that need to be multiplied by a distribution based on the user's roles and on the solutions. Thus, it is generally several hundred authorizations that must be managed. Within the framework of the invention, a computing microservice is therefore advantageously coupled with an authorization catalog or an authorization repository 40.

This authorization catalog or repository 40 can be implemented as a table in the database of the backend (either in its own microservice or in a dedicated microservice).

Thus, at least part of the access control and authorization management is implemented at each of the computing microservices.

Thanks to this, it will be possible to meet the very fine-grained authorization needs of the intensive computing solutions while ensuring a high level of security provided by the use of authentication tokens.

There are planners or schedulers making it possible, within a set of reserved resources, to distribute the computing tasks between the computing means and to order them. However, these methods and devices only intervene once the computing means have been allocated and do not allow an operator to quickly identify the nodes to be allocated.

Thus, the method according to the invention can also include a task planning step. Indeed, the method according to the invention applies to unified governance of a plurality of intensive computing solutions and it can advantageously include a step during which instructions received by the proxy microservice 20 can be processed so as to organize their optimal execution by the different intensive computing solutions available.

Preferably, the task planning step includes a queue update by each of the computing microservices 50, 51, 52, 53. Particularly, the queue update can take into account a priority index value transmitted by the user client 2.

The task planning step can also include the determination by at least one computing microservice of an amount of resources of a computing solution which will be assigned to a given task.

Furthermore, the task planning step can include the transmission of parameterization data to the intensive computing solution in charge of executing a given task. The parameterization data could for example correspond to one or several input files, or even to a setting specific to the intensive computing solution.

Preferably, the task planning step can also include, during the initiation of a task, the transmission of environment parameterization data such as identifiers of the job directories to be used, the data access paths or the libraries to be used.

Furthermore, the planning step can include:
a monitoring of the tasks (i.e. jobs) including the determination of the progress of the jobs, the recording of application logs, the recording of result files, the determination of amounts of resources used, the determination of a used credit value,
a conclusion or a suspension of the jobs,
a resumption of the suspended jobs,
a modification of the parameters of the jobs.

Preferably, the method according to the invention can include an automated segmentation of a task into a plurality of subtasks assigned to several different intensive computing solutions. Alternatively, a user can, via the aggregation interface, define the distribution of sub-tasks of the same project through several intensive computing solutions. These sub-tasks can be executed in series or in parallel depending on their specificities.

According to another aspect, the invention relates to a computer system 1 for managing authorizations granted to a user client 2 from an aggregated interface 10 within the framework of unified governance of a plurality of intensive computing solutions 70.

Particularly, an authorization management computer system 1 according to the invention can include: a proxy microservice 20, a token security microservice 30, at least one security repository 35, 36, 37 at least one computing microservice 50, 51, 52, 53 and an authorization repository 40. The authorization management computer system 1 can include one or several authorization repositories 40 as presented in FIG. 3. Indeed, each computing microservice 51, 52, 53 can be associated with an authorization repository 40.

Figure 3:
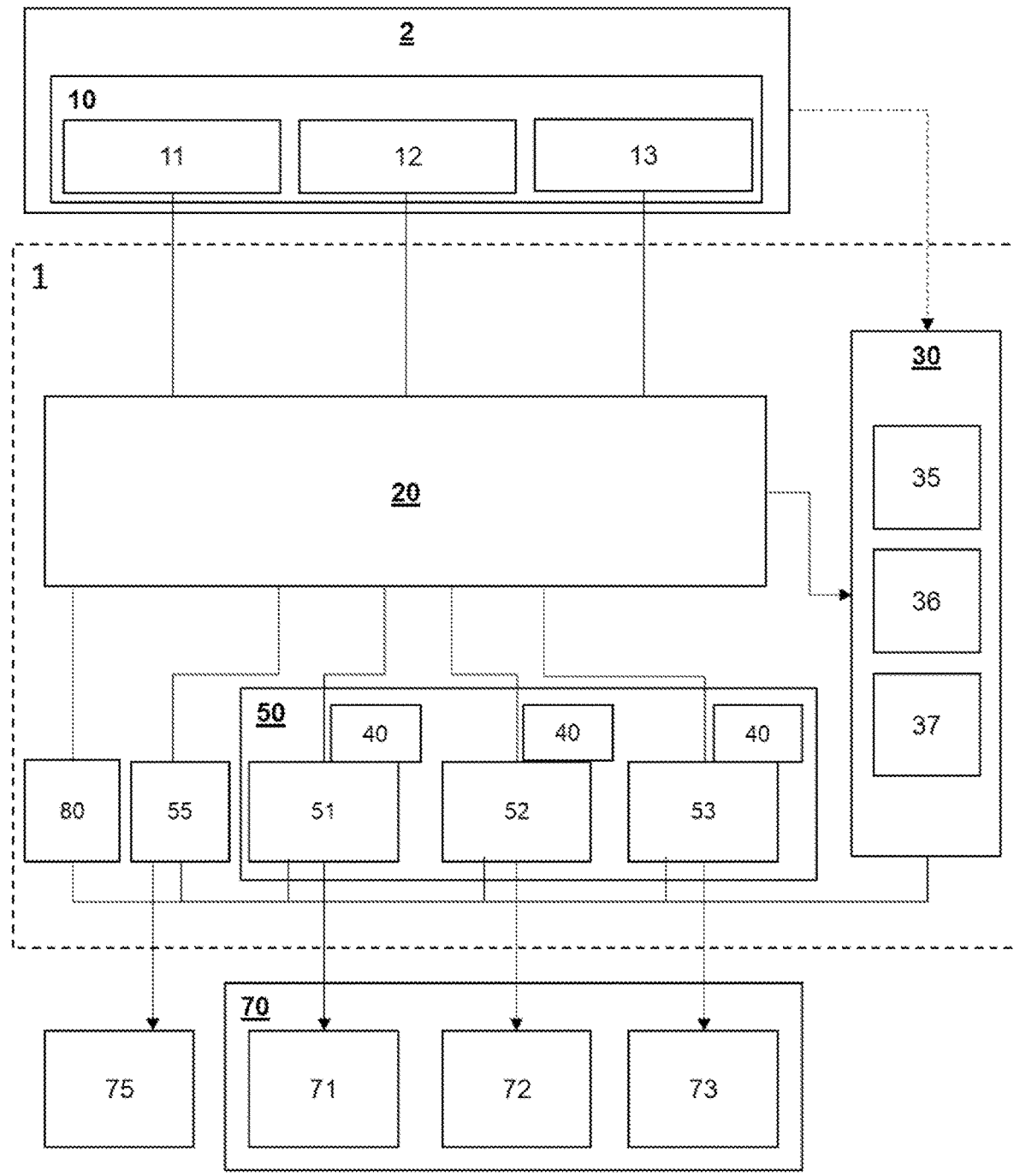
FIG. 3 represents a diagram of a computer system for managing authorizations granted to a user client according to one embodiment of the invention.

In addition, as presented in FIG. 3, an exemplary schematic diagram of an authorization management computer system 1 according to the invention can also include: a remote visualization server 80, preferably a 3D remote visualization server.

Considering the implementation of the system according to the invention, the latter can be hosted by one or several computer servers. It includes particularly a set of microservices such as microservices implemented according to coding protocols of the node.js type or other technologies such as Go, Java/Kotlin/Scala, PHP, Python, Pharo, Elixir, Clojure and Haskell.

The microservices can use configuration entities, such as Json files or XML files or similar representations, as inputs to provide the basic components of the logic, of the transformations, of the mapping and of the management of the keys of the system 1.

Each of the services or solutions (token security service, management service, intensive computing solution) accessible via the proxy microservice 20 can be supported by a corresponding microservice or a chain of microservices providing the logic of implementation of the provided service. Within the framework of the method according to the invention, the microservices can be executed individually and separately in a security zone as microservice(s).

Particularly, an authorization management computer system 1 according to the invention includes a proxy microservice 20, configured to receive access information of a user client 2. The proxy microservice 20 can be coupled to an add-on that allows taking into account the authorization policies specific to each microservice (business logics), this allowing a standardization of the exchanges between the proxy microservice 20 and the token security microservice 30. Particularly, this can be used to synchronize user attributes (potentially of very different nature therebetween) in correspondence with the roles specific to the business logics/microservices.

The proxy microservice 20 is advantageously configured to route the incoming requests towards the appropriate microservice as a function of the specified endpoint, of the logic and/or of the arguments.

Particularly, the computing microservices 50, 51, 52, 53 coupled to the proxy microservice 20 can be configured to point towards (or be linked) respectively to a particular service or to a particular server. Thus, when a computing microservice is called, a corresponding intensive computing service is selected.

Particularly, an authorization management computer system 1 according to the invention includes a token security microservice 30, configured to receive the access information of a user client 2, to authenticate the user client 2 and to determine at least a role attribute for the user client 2 from the access information and data stored in a security repository 35, 36, 37.

Preferably, the token security microservice 30 is further configured to generate a token, said token allowing an access to all the intensive computing solutions accessible to said user client 2 based on the at least one determined role attribute.

Preferably, although the token security microservice 30 forms part of a management computer system 1 according to the invention, it is advantageously hosted on one or several different computer devices (e.g. servers) distinct from the computer device(s) hosting the proxy microservice 20 and/or the computing microservices 50, 51, 52, 53.

The token security microservice 30 can be configured to route the incoming requests towards the appropriate service as a function of the specified endpoint, of the logic, and/or of the arguments.

Particularly, the token security microservice 30 coupled to the proxy microservice 20 can be configured to point towards (or be linked to) a particular service or server. The token security microservice 30 can be configured to access a plurality of directories, preferably at least LDAP type directories 35, Active Directory 36 and Kerberos 37.

Furthermore, the token security microservice 30 can advantageously be configured so as to be able to assign shared roles or specific roles, preferably it is configured so as to be able to assign a role shared by all the computing microservices 50, 51, 52, 53.

The authorization management computer system 1 according to the invention includes at least one computing microservice 50, 51, 52, 53 for each of the intensive computing solutions 70, 71, 72, 73. Each of the computing microservices 50, 51, 52, 53 can be linked to its respective intensive computing solution in secure channels such as ssh or mobile shell connections.

Preferably, each of the computing microservices 50, 51, 52, 53, is configured to determine authorizations granted to the user client 2.

Indeed, once a role attribute has been determined, it can be transferred to a microservice which can determine, based on the role attribute value and on the data contained in an authorization repository 40, authorizations granted to the user client 2.

Furthermore, an authorization management computer system 1 according to the invention can also include a management microservice 55. Such a management microservice could be connected to the computing microservices 50, 51, 52, 53, to the proxy microservice and to the token security microservice. In addition, this management microservice can be configured to distribute the computing tasks between the computing means and to order them. Particularly, it can be configured to organize the optimal execution of the tasks by the different intensive computing solutions available. In addition, such a management microservice 55 could be linked to a service 75 dedicated to scheduling.

Furthermore, the authorization management computer system 1 according to the invention can also include a remote visualization server 80, preferably a 3D remote visualization server. Such a remote visualization server 80 allows user clients 2 to execute interactive 2D/3D graphics applications on remote servers instead of their system, and to open visualization sessions to control them remotely. Thus, all of the computing and rendering of the graphics applications, including the 3D rendering, is carried out on the server side on dedicated resources. The keyboard and mouse inputs from the user client 2 are transferred to the server which, in return, encodes the graphics scene in pixels and returns the data in the form of video stream to the user client 2. The user client 2 is then only responsible for the rendering of the 2D video stream. Such a server allows working only on remote data without having to transfer it over the network. Generally indeed, the computing result files can be very large (from gigabytes to terabytes) and cannot be transferred efficiently via Internet or corporate private networks. Furthermore, such a remote visualization associated with the management of the authorizations according to the invention allows increasing the security of the technology.

What is claimed is:

1. A method for managing authorizations granted to a user client from an aggregated interface within a framework of unified governance of a plurality of intensive computing solutions on a single platform, said plurality of intensive computing solutions including at least two solutions selected from a high performance computing server, a server dedicated to supervised or unsupervised learning and a server dedicated to quantum computing;
wherein said plurality of intensive computing solutions include different intensive computing solutions having different business logics,
wherein said plurality of intensive computing solutions allow exposing, according to a single model, models and fields of varied intensive performance computing applications,
wherein the framework of unified governance is ensured at least partly by an authorization management computer system to manage said authorizations,
wherein said authorization management computer system comprises
a proxy microservice,
a token security microservice,
at least one security repository,
at least one authorization repository or a catalog, implemented as a table, and
at least one computing microservice for each intensive computing solution of the plurality of intensive computing solutions, such that each computing microservice of said at least one computing microservice is dedicated to an intensive computing solution of said plurality of intensive computing solutions that cooperates with said proxy microservice and said aggregated interface;
said method comprising:
receiving, by the token security microservice, access information of the user client,
wherein the token security microservice is completed by said at least one authorization repository or by said catalog in the at least one microservice,
wherein the access information of the user client comes from a message sent from an aggregated interface of the user client to the proxy microservice,
processing said message to extract an access request,
compiling a list of access rights granted for the user client,
authenticating the user client and determining, by the token security microservice, at least one role attribute for the user client from access command information and data stored in the at least one security repository, wherein said at least one role attribute is previously determined,
generating a token, by the token security microservice,
said token allowing an access to all intensive computing solutions of said plurality of intensive computing solutions accessible to said user client based on the at least one role attribute that is determined, via a single sign on in a homogenous manner,
such that said token that is generated is a persistent login token allowing an authentication and a role assignment to the user client for all intensive computing solutions of said plurality of intensive computing solutions without a need to re-identify,
such that at least part of said access and managing said authorizations is implemented at said each intensive computing solution of the plurality of intensive computing solutions, and
determining authorizations granted to the user client, by the at least one computing microservice, said determining being based on the at least one role attribute that is determined and data contained in the at least one authorization repository,
wherein said authorizations are enabled and managed within the framework of unified governance via a single point of entry to said different business logics of said plurality of intensive computing solutions with unified ergonomics of a unified double interfacing bearing both on a unified user interface base as a frontend and a unified interfacing of the different business logics to a background platform as a backend from said plurality of intensive computing solutions,
wherein said each computing microservice of said at least one computing microservice includes a service that fits in a virtual machine or a container, such that the virtual machine or the container never allocate more physical resources than a physical server that hosts the virtual machine or the container.

2. The method for managing authorizations granted to a user client according to claim 1, wherein the message coming from the user client includes identification data of the user client.

3. The method for managing authorizations granted to a user client according to claim 1, wherein the generating the token by the token security microservice includes access to a plurality of directories, said plurality of directories comprising at least LDAP type directories, Active Directory and Kerberos.

4. The method for managing authorizations granted to a user client according to claim 1, wherein the determining the at least one role attribute for the user client includes assignment of a role shared by all computing microservices of said at least one computing microservice for said each intensive computing solution of the plurality of intensive computing solutions.

5. The method for managing authorizations granted to a user client according to claim 1, wherein the determining the at least one role attribute for the user client includes assignment of a specific role to said at least one computing microservice.

6. The method for managing authorizations granted to a user client according to claim 1, wherein the determining the at least one role attribute for the user client is performed from the access command information and the data stored in the at least one security repository.

7. The method for managing authorizations granted to a user client according to claim 1, further comprising modifying the aggregated interface as a function of authorizations granted to the user client.

8. The method for managing authorizations granted to a user client according to claim 1, further comprising task planning comprising
determining by said at least one computing microservice of an amount of resources of a computing solution which will be assigned to a given task.

9. The method for managing authorizations granted to a user client according to claim 1, further comprising task planning comprising a queue update, by each computing microservice of said at least one computing microservice for said each intensive computing solution of the plurality of intensive computing solutions.

10. The method for managing authorizations granted to a user client according to claim 9, wherein the task planning comprising said queue update takes into account a priority index value transmitted by the user client.

11. The method for managing authorizations granted to a user client according to claim 8, wherein said task planning further comprises
transmitting parameterization data to said each intensive computing solution in charge of executing said given task, said parameterization data corresponding to at least one input file or to a setting that is specific to said each intensive computing solution,
during an initiation of said given task, transmitting environment parameterization data comprising identifiers of job directories to be used, data access paths or libraries to be used.

12. The method for managing authorizations granted to a user client according to claim 8, wherein said task planning further comprises
automatically segmenting said given task into a plurality of subtasks assigned to several different intensive computing solutions of said plurality of intensive computing solutions, or
defining, from said user client, a distribution of said plurality of subtasks of a same project through several different intensive computing solutions of said plurality of intensive computing solutions via said aggregate interface,
wherein said each computing microservice of said at least one computing microservice is linked respectively to a particular intensive computing solution of said plurality of intensive computing solutions,
such that when a computing microservice of said at least one computing microservice is called, a corresponding intensive computing solution of said plurality of intensive computing solutions is selected.

13. A non-transitory computer system for managing authorizations granted to a user client from an aggregated interface within a framework of unified governance of a plurality of intensive computing solutions on a single platform, said plurality of intensive computing solutions including at least two solutions selected from a high performance computing server, a server dedicated to supervised or unsupervised learning and a server dedicated to quantum computing;
wherein said plurality of intensive computing solutions include different intensive computing solutions having different business logics,
wherein said plurality of intensive computing solutions allow exposing, according to a single model, models and fields of varied intensive performance computing applications,
wherein the framework of unified governance is ensured at least partly by said non-transitory computer system,
said non-transitory computer system for managing said authorizations comprising:
a processor configured to execute instructions to implement
a proxy microservice configured to receive access information of said user client;
a token security microservice configured to receive the access information of said user client received by the proxy microservice, to authenticate the user client and to determine at least one role attribute for the user client from the access information and data stored in a security repository,
wherein the token security microservice is completed by said at least one authorization repository or by said catalog in the at least one microservice,
wherein said at least one role is previously determined,
wherein the access information of the user client comes from a message sent from an aggregated interface of the user client to the proxy microservice,
wherein said token security microservice is further configured to
process said message to extract an access request,
compile a list of access rights granted for the user client,
generate a token, said token allowing an access to all intensive computing solutions of said plurality of intensive computing solutions that are accessible to said user client based on the at least one role attribute that is determined, via a single sign on in a homogenous manner,
such that said token that is generated is a persistent login token allowing an authentication and a role assignment to the user client for all intensive computing solutions of said plurality of intensive computing solutions without a need to re-identify,
such that at least part of said access and managing said authorizations is implemented at said each intensive computing solution of the plurality of intensive computing solutions;
at least one non-transitory computing microservice for each intensive computing solution of the plurality of intensive computing solutions, such that each non-transitory computing microservice of said at least one non-transitory computing microservice is dedicated to an intensive computing solution of said plurality of intensive computing solutions that cooperates with said proxy microservice and said aggregated interface, the at least one non-transitory computing microservice being configured to determine authorizations granted to the user client, said determine being based on the at least one role attribute that is determined and data contained in an authorization repository or in a catalog, wherein said authorization repository or said catalog is implemented as a table;

wherein said authorizations are enabled and managed within the framework of unified governance via a single point of entry to said different business logics of said plurality of intensive computing solutions with unified ergonomics of a unified double interfacing bearing both on a unified user interface base as a frontend and a unified interfacing of the different business logics to a background platform as a backend from said plurality of intensive computing solutions, wherein said each non-transitory computing microservice of said at least one non-transitory computing microservice includes a service that fits in a virtual machine or a container, such that the virtual machine or the container never allocate more physical resources than a physical server that hosts the virtual machine or the container.

14. The non-transitory computer system for managing authorizations granted to a user client according to claim 13, wherein the token security microservice is further configured to access a plurality of directories, said plurality of directories comprising at least LDAP type directories, Active Directory and Kerberos.

15. The non-transitory computer system for managing authorizations granted to a user client according to claim 13, wherein the token security microservice is further configured to route incoming requests towards an appropriate service as a function of one or more of a specified endpoint, logic and arguments.

16. The non-transitory computer system for managing authorizations granted to a user client according to claim 13, further comprising an add-on that allows taking into account authorization policies specific to each computing microservice of the at least one non-transitory computing microservice, allowing a standardization of exchanges between the proxy microservice and the token security microservice.

17. The non-transitory computer system for managing authorizations granted to a user client according to claim 13, wherein the token security microservice is further configured to assign shared roles or specific roles, and further configured to assign a role shared by all computing microservices of the at least one non-transitory computing microservice.

18. The non-transitory computer system for managing authorizations granted to a user client according to claim 13, wherein the at least one non-transitory computing microservice is selected from a microservice linked to a high performance computing server, a microservice linked to a server dedicated to supervised or unsupervised learning, and a microservice linked to a server dedicated to quantum computing simulations.

19. The non-transitory computer system for managing authorizations granted to a user client according to claim 13, wherein the token security microservice is hosted on one or several different computer devices, distinct from one or more computer devices hosting one or more of the proxy microservice and the at least one non-transitory computing microservice.

20. The non-transitory computer system for managing authorizations granted to a user client according to claim 13, further comprising a management microservice configured to distribute computing tasks between computing means and further configured to order them.

* * * * *